United States Patent [19]
McCarthy

[11] Patent Number: 5,938,926
[45] Date of Patent: Aug. 17, 1999

[54] EXTENDED DWELL REVERSE HYDROCYCLONE CLEANER

[75] Inventor: Christopher E. McCarthy, Middletown, Ohio

[73] Assignee: Thermo Black Clawson

[21] Appl. No.: 08/913,594

[22] PCT Filed: Aug. 8, 1996

[86] PCT No.: PCT/US96/12880

§ 371 Date: Sep. 12, 1997

§ 102(e) Date: Sep. 12, 1997

[87] PCT Pub. No.: WO97/06871

PCT Pub. Date: Feb. 27, 1997

Related U.S. Application Data

[60] Provisional application No. 60/002,177, Aug. 11, 1995.

[51] Int. Cl.[6] ................................................. B01D 21/26
[52] U.S. Cl. .................... 210/512.1; 210/788; 55/459.1; 162/4; 162/5 S; 209/727; 209/732
[58] Field of Search ................................. 210/512.1, 788; 162/4, 5 S; 209/722, 732, 725, 727; 55/459.1

[56] References Cited

U.S. PATENT DOCUMENTS

| | | | |
|---|---|---|---|
| 2,377,524 | 6/1945 | Samson et al. | 92/28 |
| 2,757,581 | 8/1956 | Freeman et al. | 92/28 |
| 2,975,896 | 3/1961 | Hirsch . | |
| 3,096,275 | 7/1963 | Tomlinson, II . | |
| 3,425,545 | 2/1969 | Zemanek et al. | 209/2 |
| 3,486,619 | 12/1969 | Grundelius et al. . | |
| 3,557,956 | 1/1971 | Braun et al. . | |
| 3,912,579 | 10/1975 | Braun | 162/4 |
| 4,378,289 | 3/1983 | Hunter . | |
| 5,049,277 | 9/1991 | Kalnins | 210/512.1 |
| 5,225,082 | 7/1993 | Young et al. | 210/512.1 |
| 5,667,686 | 9/1997 | Schubert | 210/512.1 |

FOREIGN PATENT DOCUMENTS

97/05957  2/1997  WIPO .

OTHER PUBLICATIONS

"Pulp Production: Berstrom finds 'reverse cleaning' answer to lightweight contaminants," James Clay, *Paper Trade Journal*: Aug. 15, 1980, pp. 28–30.

"Through–Flow Cleaners Offer Good Efficiency with Low Pressure Drop" Terry Bliss, *Pulp & Paper*, Mar. 1985, pp. 2–6.

*Primary Examiner*—David A. Reifsnyder
*Attorney, Agent, or Firm*—Biebel & French

[57] ABSTRACT

A reverse hydrocyclone cleaner (10) for the centrifugal separation of lightweight contaminants contained in a suspension of papermaking fibers is formed with an elongated hollow body (12) of circular cross section which converges uniformly from a first inlet end to a second apex end, in which the ratio of the length of the conical body to its largest diameter is at least approximately 20 to 1 and defines an included angle of less than 3 degrees.

9 Claims, 3 Drawing Sheets

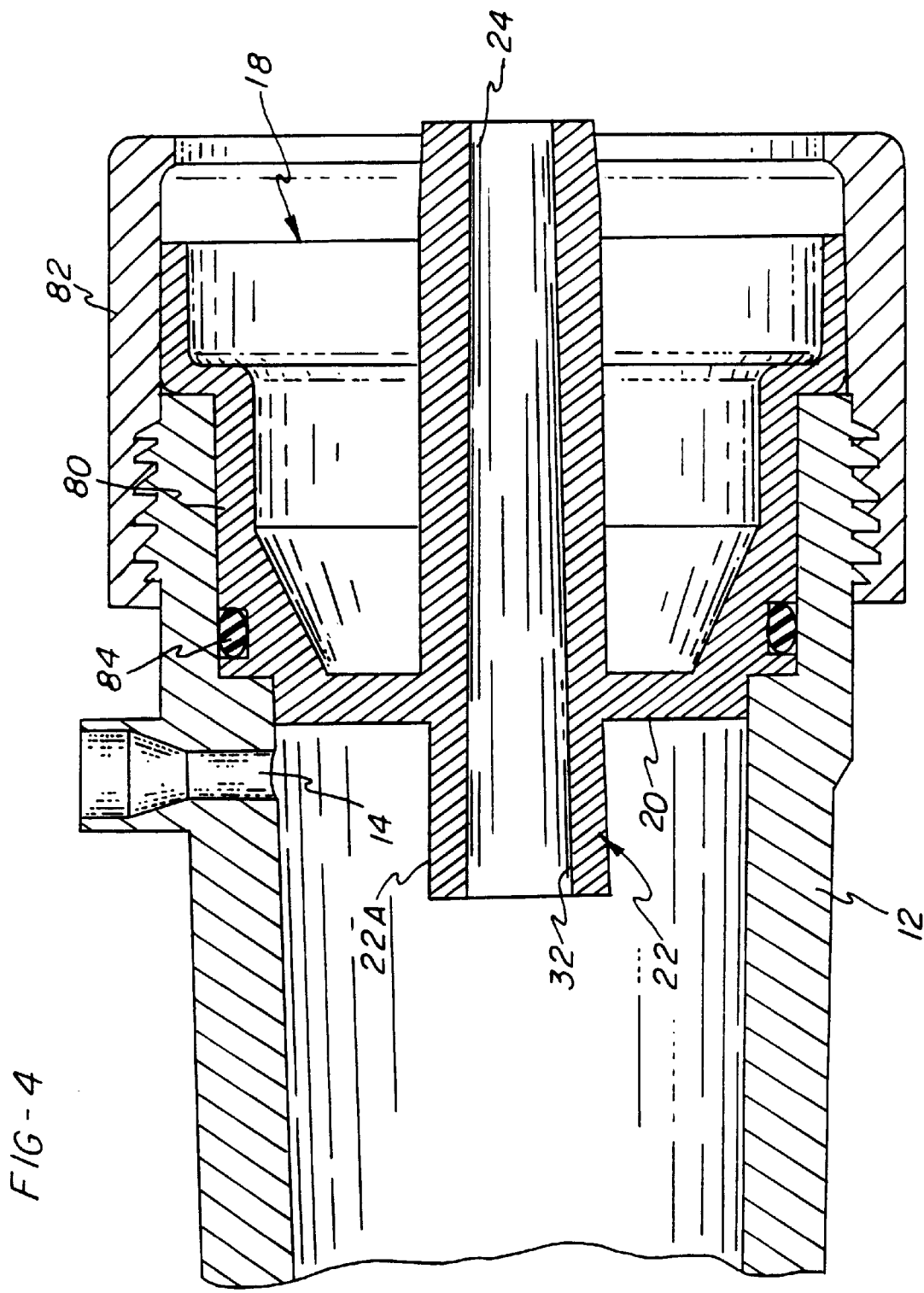

EXTENDED DWELL REVERSE HYDROCYCLONE CLEANER

This application is the National Stage of International Application No. PCT/US96/12880, filed Aug. 8, 1996, which claims the benefit of U.S. Provisional Application No. 60/002,177, filed Aug. 11, 1995.

BACKGROUND OF THE INVENTION

1. Field of the Invention

This invention relates to hydrocyclone cleaners used for cleaning a suspension of papermakers' fibers, otherwise commonly known as papermakers' stock, and more particularly to a reverse cleaning hydrocyclone with extended dwell time.

2. Description of the Related Art

The terms "forward cleaning" and "reverse cleaning" have become well understood in the art of cleaning papermakers' stock, and relate primarily to the manner in which a cyclone-type centrifugal cleaner is operated. Examples of cyclone-type cleaners connected and used as forward cleaners, in which the accepts are removed at the base of the cone while the rejects are removed from the apex, are shown in Samson et al, U.S. Pat. No. 2,377,524 issued Jun. 5, 1945 and Grundelius et al, U.S. Pat. No. 3,486,619 issued Dec. 30, 1969. In a reverse cleaner system, a cyclone-type cleaner is operated in such a manner that the accepts are removed from the apex of the cone, while the lighter rejects are taken out at the base, as shown in Braun, U.S. Pat. No. 3,912,579 issued Oct. 14, 1975, and in Braun et al, U.S. Pat. No. 3,557,956 issued Jan. 26, 1971.

Hydrocyclone cleaners have been used for many years in the preparation of papermakers' stock and particularly for cleaning such stock by removing undesirable heavier and lighter weight components from the water base. Until the advent of the teachings of Braun as disclosed in U.S. Pat. No. 3,912,579, such hydrocyclone cleaners were operated in what was then considered the "conventional" manner, in which the heavier contaminants were extracted from a bottom or apex outlet, while the "good" fibers and water absent the heavier contaminants were extracted from a top outlet in the base of the cone.

Flow conditions within the hydrocyclone have been studied and reported in the patent literature, and two patents stand out by reason of detailed analysis of the hydrocyclone and attempts to arrive at optimum diameters and the optimum taper or slope of the cone walls. These include Samson et al. U.S. Pat. No. 2,377,524 and Tomlinson U.S. Pat. No. 3,096,275.

Samson et al. proposed a considerably longer cone length than had herebefore been used, and recommended a cone length-to-base diameter ratios of about 11 to 1 (cone diameter at base 3", length of cone 33") page 4, column 2, lines 12–15, up to about 15 to 1 (page 5 col. 2 lines 30–50). The latter example provided an included cone angle, of about 3.6 degrees.

Since the heavy material which is to be separated flows to the outside of the vortex and alongside the inside sloping surfaces of the cone, too great a cone angle itself will provide resistance to the separation of the heavier components, since a steep cone angle will resist the flow of these heavier components to the apex outlet. In spite of the use of the shallow cone angles, Samson et al. did not have particularly good success since they lost between 20% and 33% of the dry weight of the good fibers through the bottom rejects opening along with the heavy contaminants (page 3 col. 2 lines 15–30, and page 5 col. 1, lines 29–51). It is likely that this high loss of good fiber was, at least in part, due to the fact that the good papermakers' fibers also have a specific gravity which is greater than water and tend also to be carried to the wall of the hydrocyclone and then become separated with the heavier contaminants.

Tomlinson U.S. Pat. No. 3,096,275 re-studied the problem of defining the efficient size and shape of a hydrocyclone and, in his Example 13, Table III, he even tested a unit having the measurements "selected by Samson and Croup" (col. 12, lines 24–33). He recommended the use of large diameter cones with a head section of from 7" to 12" in diameter (column 4 lines 38–45) and he increased the included angle to between 10° and 18°. As a result, Tomlinson was able to control the discharge from the rejects outlet to a very small flow where it contained only 1.310% of the total solids applied, (column 4 line 73). By use of a large cone and a steep wall angle, he obtained higher internal shear to which he attributed the high rate of retention of good fibers (column 7 lines 55–75).

When Braun, and others, began operating the hydrocyclone as a "reverse cleaner" the hydrocyclone construction remained essentially in the shape preferred by Tomlinson. This arrangement was effective in removing light weight rejects since it was no longer necessary to force a differentiation between the heavier "good" paper fibers and heavy contaminants. However, no effort is known to have been made to optimize the shape of a hydrocyclone specifically for reverse cleaning, such as by lengthening the cone, since Tomlinson had shown that higher included angles provided a better separating mechanism. There is accordingly a need for a reverse hydrocyclone specifically designed for more efficiently separating lightweight contaminants from papermakers' stock.

SUMMARY OF THE INVENTION

In the broadest sense, the invention is a reverse hydrocyclone paper stock cleaner comprising an elongated hollow body which is conical over a substantial part of its length and having a tangential inlet near its base. The conical section as described has a length-to-diameter ratio of at least 20:1, and preferably at least 23:1. The length-to-diameter ratio is limited only in that at least most boundary conditions acting on the flow are "conical" rather than "cylindrical"—e.g., the body must retain a sufficient taper to induce some annular acceleration in the flow as the fluid moves down the cleaner. The conical section has an included angle of less than 30°, and typically provides an average residence or dwell time of at least two seconds.

The base of the conical body terminates in a cap mounting a frusto-conical vortex finder. The conical section and the vortex finder define underflow (rejects) and overflow (accepts) outlets such that the area of the underflow outlet is approximately equal to, or slightly larger than, the area of the overflow outlet. The underflow and overflow outlets are positioned at the ends of opposed frusto-conical passages each diverging toward the interior of the body. In a particularly preferred form, the tangential inlet has an area approximately the same as the area of the overflow (accepts) outlet.

The typical reverse hydrocyclone cleaner to which this invention is applied will have a pressure drop in the range of between approximately 30 and 90 psi, and may be operated with a stock consistency as low as 0.5% or lower and up to about 2% consistency, or higher. It will have a hydraulic reject rate of approximately between 30 and 70% and generally will have a major diameter of approximately 6" or less.

The preferred reverse cleaner has been found to produce a rejects underflow having an extremely low fiber content. A significant factor contributing to this low fiber content is the increased dwell (retentive) time available as the fluid spirals through the long conical body as compared to the movement through conventional reverse cleaners having much lower length-to-diameter ratios. The additional dwell time provides a greater opportunity for the components to move radially either inwardly or outwardly depending on specific gravity, thereby improving the sharpness of the separation.

The dwell time may be defined in terms of the "necessary average radial velocity" which is required for a reject particle to leave the region of the inner surface of the cone, at the largest diameter, and enter into the upwardly spiralling rejects flow in the core or center of the cone leading to the vortex finder at the top. The lower this time, in feet per second for example, the more complete will be the separation between the lightweight rejects and the good fibers. The calculation of the necessary average radial velocity (NARV) is the radius at the base of the cone or the largest diameter divided by the average retention time. The average retention time equals the mass flow rate at the inlet, such as in cubic feet per second divided by the internal volume, such as in cubic feet. The cleaner of this invention has a smaller NARV, less than 0.10 feet/second.

Another factor contributing to the low fiber content of the rejects is the increased stability in the flow due to the cone length and also due to the opposed inwardly-tapering frusto-conical passages defined by the outlets, which reduce mixing between annular layers of the fluid once the particles have begun to separate radially. Smooth interior surfaces formed in the process of casting the body from a thermoplastic likewise promote the stability of the flow and help to offset power losses due to the increased inner surface area of the cleaner. Apart from flow stabilization, the outward taper of the outer surface of the frusto-conical vortex finder, as one moves inwardly along an axis of the cleaner, impedes fibers from "short-circuiting" from the tangential inlet to the overflow outlet.

The reverse cleaner of this invention is based on two major conditions that make the cone length critical. These are:

1) The fact that the rejects enter tangentially at the outside wall and must travel to the axial center, as compared to a forward cleaner in which the contaminants enter tangentially at the outside wall and must be maintained at the outside wall. In a forward cleaner, the heavier-than-water good fibers must be hydraulically dragged into the central overflow.

2) The fact that the good fibers move radially outwardly while the contaminants move radially inwardly.

From the centripetal acceleration equation, (CA= tangential velocity squared divided by the radial distance from the central axis) the fluid continually is accelerated during its movement through the cone, because the cone diameter is decreasing. The particles with a specific gravity greater than the fluid medium, which is generally water (1.0 specific gravity), move radially outwardly toward the inside wall of the hydrocyclone. The contaminants that are removed in the reverse cleaner have a specific gravity less than the fluid medium and move radially inwardly toward the axial center. Since the entire flow starts adjacent to the outside wall, these lighter materials must be provided a certain period of time to move to the axial center. This necessary time is determined by cleaner diameter and the relationship of the contaminant's physical characteristics in relation to the fluid and the fiber consistency. Internal mixing interrupts the movement of these particles to the axial center. Mixing also disrupts the movement of the fiber and other material to the outside wall. When the mixing from an unstable flow disrupts the fiber moving or maintaining itself on the outside wall, it can be hydraulically dragged into the reject stream, increasing the fiber content in the rejects by a multiple of 5–8 or even greater.

In a reverse cleaner, the fiber is desired in the accept underflow stream while the contaminants are desired in the reject overflow stream. Since the fiber and contaminant move in radially opposite directions, a greater retention time per radial distance travelled and an increased rotational flow stability encourage the fiber to be accepted and the contaminants to be rejected. The long tapered cone results in continual acceleration of the rotational rate increasing stability. Therefore, in the reverse cleaner as opposed to the forward cleaner, the contaminant radial movement can be optimized. While Samson et al. with an L/D ratio of about 15 to 1 showed a high loss rate of good fibers, further decreases in the included angle and/or further increases in the relative length would have been further counterproductive, as found by Tomlinson, in a forward cleaners.

A further important consideration in the design of the cleaner according to this invention is that it should have a conical shape throughout a substantial portion of its length. In fact, no substantial portion of the operable cleaner should be purely cylindrical, although the cleaner body may be cylindrical, rather than conical, along approximately the axial length of the vortex finder in the cap. Any such cylindrical section should not be significantly longer as measured axially than the depth of extention of the vortex finder in the body.

Applications and systems including reverse cleaners are described in a co-pending PCT Application entitled "Forward/Reverse Cleaner Systems and Methods for Suspension of Paper Stock," Serial No. PCT/US96/10679, filed Jun. 20, 1996, the disclosure of which is incorporated herein by reference.

It is accordingly an important object of the invention to provide a reverse-type hydrocyclone cleaner for papermakers' stock in which the major portion of the body of the cleaner is conical and has a ratio of length to diameter of at least 20 to 1, and the conical portion of which has an included angle of less than 3°.

Another object of the invention is to provide a reverse flow cleaner in which a substantially longer dwell time is provided under conditions of relatively high stability of flow to permit optimum separation of lightweight contaminants and good retention of fibers.

A further object of the invention is the provision of a hydrocyclone cleaner, as outlined above, in which a vortex finder is formed with a outer surface of frusto-conical shape and which diverges as it extends into the cleaner.

Other objects and advantages of the invention will be apparent from the following description, the accompanying drawings and the appended claims.

BRIEF DESCRIPTION OF THE DRAWINGS

FIG. 4 is an enlarged fragmentary section through the inlet end of the cleaner of FIG. 3.

DETAILED DESCRIPTION OF THE PREFERRED EMBODIMENT

Figure 1:
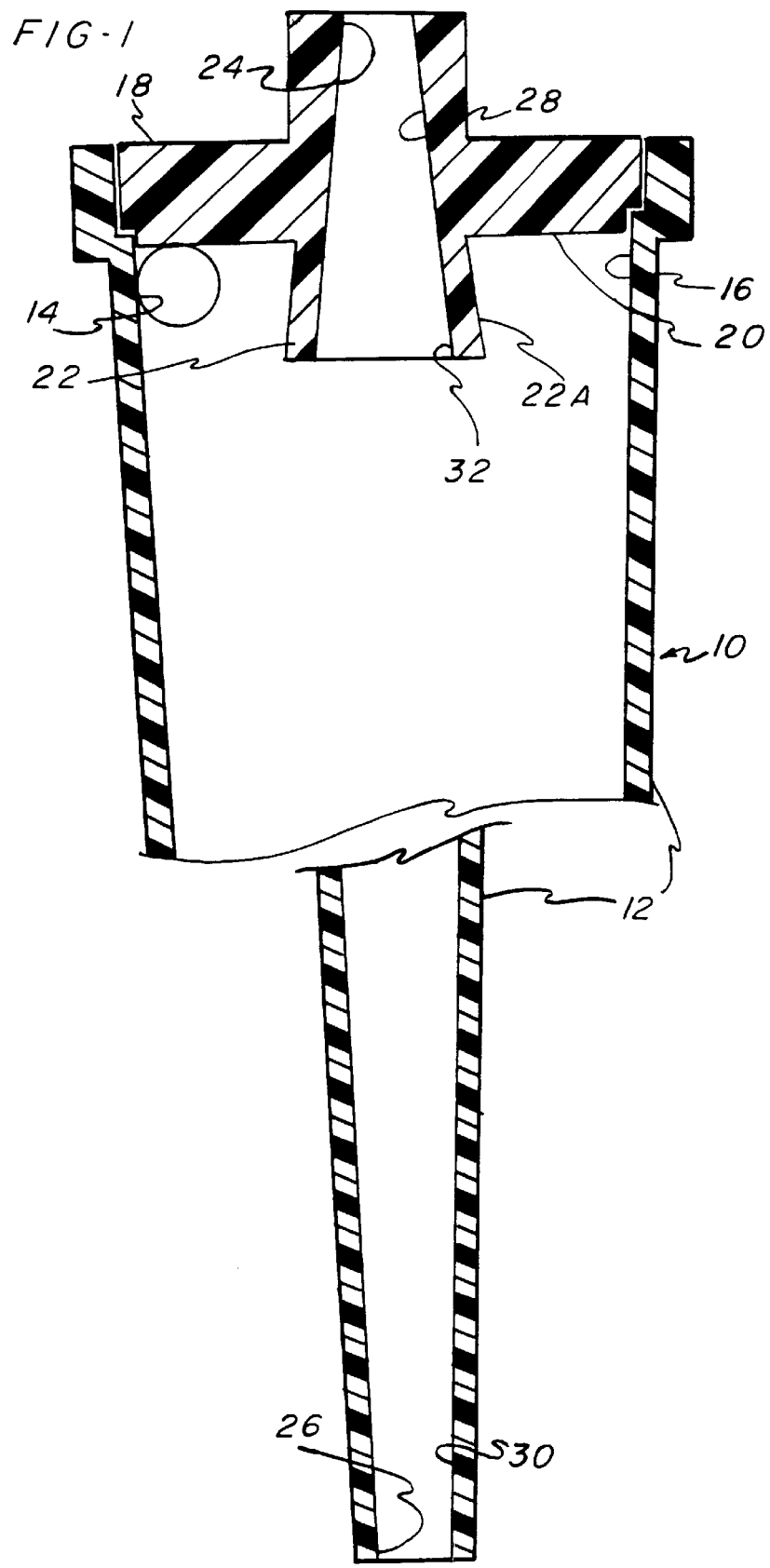
FIG. 1 is a sectional diagrammatic and partially broken away view of the reverse cleaner of the invention.
Figure 3:
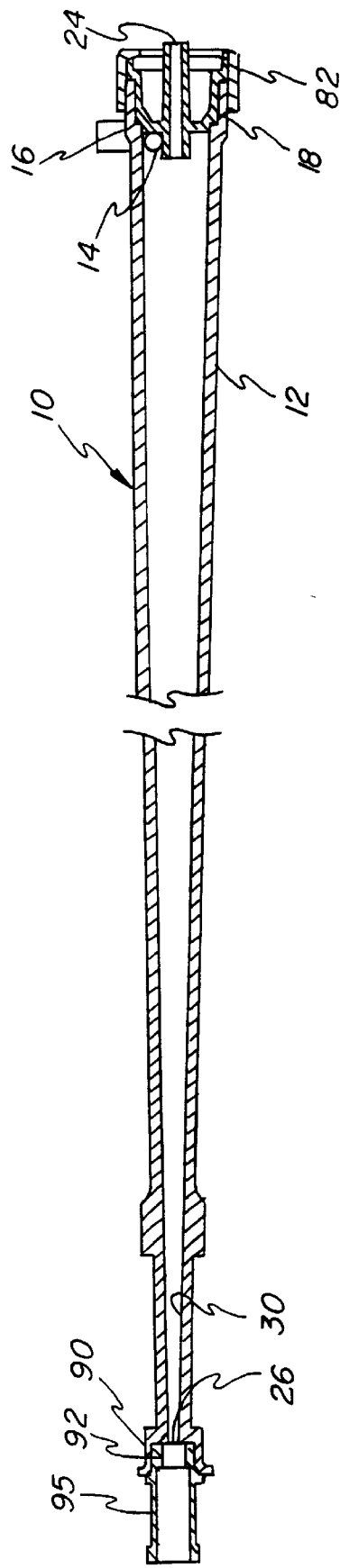
FIG. 3 is a transverse section, partially broken away, of a preferred embodiment of the reverse cleaner which is diagrammatically illustrated in FIG. 1.

Referring initially to FIGS. 1 and 3, a reverse cleaner 10 includes an elongated hollow body 12 composed of a thermoplastic material and having a tangential inlet 14 near its base 16. The body is conical over a substantial part of its length and preferably over at least 90% of its operational length although a small portion at the base end may be cylindrical as previously described. Preferred thermoplastic materials include unfilled nylon and polyurethane. The base 16 of the conical body 12 is coupled to an end cap 18 likewise composed of a thermoplastic material which defines a substantially planar annular surface 20 surrounding a frusto-conical vortex finder 22. A small portion of the elongated body 12 may be cylindrical adjacent to the cap 18 but any such cylindrical section should not extend axially any significant distance beyond the inner end of the vortex finder 22.

The elongated conical body 12 and the vortex finder 22 respectively define overflow and underflow outlets 24, 26. The areas of the tangential inlet 14 and the overflow outlet 24 are approximately the same, while the area of the underflow outlet 26 is approximately the same as, or slightly larger than, the area of the overflow outlet 26. The overflow and underflow outlets 24, 26 are positioned at the ends of opposed inwardly-tapering frusto-conical passages 28, 30.

The diameter (inside) of the body 12 at the base 16 should not exceed 6" and preferably is about 3" or less. The included angle formed by the interior of the body 12 should be less than 3°, providing an L/D ratio of at least 20:1.

In use, water entraining paper pulp fibers and contaminant particles are injected tangentially through the tangential inlet 14 into the interior of the conical body 12. The fluid within the conical body 12 forms two annularly-arranged flow domains each rotating in the same direction: an outer flow domain near the inner wall of the conical body 12 spiraling toward the underflow outlet 26 and an inner flow domain spiraling toward the overflow outlet 24 between the outer flow domain and defining a central air core.

As is well-known in the art, the forces acting on the fluid and on the relatively low specific gravity contaminant particles move the lighter weight contaminant particles toward the inner flow domain and hence toward the overflow outlet 24, which constitutes the rejects. The forces acting on the relatively higher specific gravity fibers move the fibers toward the outer flow domain and hence toward the underflow outlet 26, which constitutes the accepts outlet. The outlet frusto-conical outer shape of the vortex finder 22, shown as somewhat exaggerated in FIG. 1, impedes fibers and contaminant particles from "short-circuiting" from the tangential inlet 14 to the overflow outlet 24.

Typically, the pressure drop across the cleaner will be in the range of about 30 to about 90 psi and the stock inlet consistency will be between about 0.5% to about 2%. Typically, a pressure drop in the range of 40 to 60 psi is common with openings of the feed, an accepts, and rejects ports of about ⅝" in diameter or less. The measured NARV, as previously defined, is about 0.07 feet/second, representing an average retention time of about 1.5 to 2 seconds.

The hydraulic reject rate will be between 30 and 70%. The major diameter of the conical separator portion will be around 3" or less. The actual retention rate is not critical but the relationship between the retention time and the radial distance which a lightweight particle must travel, inwardly, is important. Radial travel distance and time available translate into a typical radial velocity of a lightweight particle, through which it must travel to reach the central stream to the rejects outlet. The 20 to 1 or greater ratio of the conical section assures this separation.

The advantages of the reverse cleaner 10 are best illustrated by means of an example. A reverse cleaner 10 was constructed having a conical body 12 with a base 16 inner diameter of 2.75 inch (~7 cm) and an operational length of approximately 65 inch (~1.65 m), yielding a length-to-diameter ratio of approximately 24:1 and an included cone angle of 2.4° degrees. The conical body 12 included a tangential inlet 14 having a diameter of 0.469 inch (~1.19 cm). The reverse cleaner 10 also included a vortex finder 22 having an inlet mouth 32 (FIG. 1) with a diameter of 0.625 inch (~1.59 cm). The cleaner has an overflow diameter of 0.469 inch (~1.19 cm) at the outlet 24 and an underflow diameter of 0.500 inch (~1.27 cm) at the outlet 26. The vortex finder 22 extended 1.28" (~3.25 cm) into the inlet end, and the maximum O.D. of the reverse conical surface 22A was 1.06" (~2.7 cm) and the O.D. at wall 20 was 1.0" (~2.54 cm).

Approximately 30 gpm (~130 liters per minute) of fluid at 1% stock consistency by weight was pumped through the tangential inlet at an inlet pressure of 60 PSI (~405 kPa). Approximately 60% of the fluid was recovered from the underflow (accepts), and approximately 40% of the fluid was recovered from the overflow (rejects). The accepts at the outlet 26 had a stock consistency by weight approaching 2%, and included approximately 95% of the original stock by weight, while the rejects at outlet 24 had a stock consistency of between 0.018% to 0.025% and included only about 5% of the original stock by weight.

The performance of a reverse flow cleaner made substantially in accordance with this invention having an all conical body was compared to that of a cleaner, operated under the same conditions, in which a substantial portion of the body at the inlet or base end was cylindrical. The cleaners had the following specifications. The totally conical cleaner had a base diameter of 2.75", an included cone angle of 3°, providing a length of about 53" (theoretical). The inlet, accepts, and rejects opening diameters were as stated in the preceding paragraphs. A second cleaner used the identical conical body which was joined at the large end to a cylindrical body section 16" long and also 2.75" in diameter leading to an inlet end and an overall length of about 69". Both cleaners were run with the same stock furnish under the same conditions, namely an inlet consistency of about 1% at 120°F. at a pressure drop of 60 psi across the cleaner. Each used the identical cap and vortex finder at the inlet end.

The all-conical cleaner had a solids reject rate of 3% which means that 97% of the solids were retained in the accepts, while the partially cylindrical cleaner had a solid rejects rate of 12.9% which meant that only 87.1% of the good fibers were retained. In terms of efficiency, the all-conical unit was four times more efficient in saving fibers than was the partial cylindrical, partial conical unit, and the difference in efficiency is believed to be attributed to the presence of the substantial cylindrical section separating the conical section from the inlet cap in the partially cylindrical cleaner.

Figure 2:
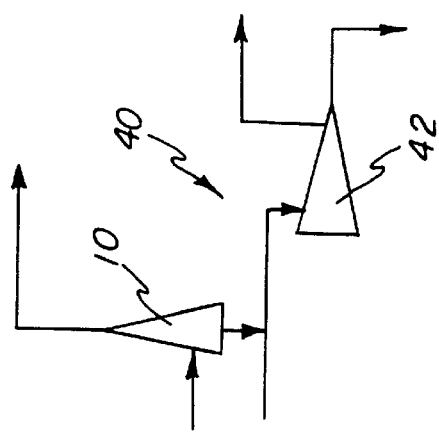
FIG. 2 is a schematic diagram of a two-stage cleaning system incorporating the reverse cleaner of the invention.

As suggested by FIG. 2, one application of the reverse cleaner 10 is as the first stage in a two-stage cleaning system 40 in which the overflow (rejects) of the reverse cleaner 10 is fed to a through-flow cleaner 42 and the accepts of the through flow cleaner 42 is recycled as dilution for the reverse cleaner 10. The through flow cleaner may be constructed as shown in the U.S. Patent of Seifert et al. U.S. Pat. No. 4,155,839 of May 2, 1979 and as manufactured and sold by the Shartle Division, The slack Clawson Company, as the 3" "X-Clone" cleaner.

FIG. 3 represents a cross-sectional view through a preferred embodiment of the reverse flow cleaner of this invention in which the parts are identified by the same numbers as those applied to FIG. 1, and in which the cone angle and the relative lengths are drawn approximately to actual scale. FIG. 4 is an enlarged sectional view through the inlet end thereof in which the preferred configuration of the end cap 18 is illustrated.

The end cap 18 is fitted into a cylindrical recess 80 formed as a rearward extension of the body 12 and retained thereon by a hollow cup 82. The end cap 18 is sealed to the surface of the recess 80 by an O-ring 84.

The accepts outlet end of the hydrocyclone cleaner 10 is preferably enlarged at 90 in an area immediately surrounding the accepts outlet 26 to receive a fluid flow straightener insert 92. The insert 92 is conventionally formed with internal ribs which disrupt the rotational velocity of the stock suspension exiting through the outlet 26. Additionally, it is conventional to add a sight glass 95 at the outlet end, also supported on the enlarged end 92, so that the operation of the hydrocyclone may be observed.

While the form of apparatus herein described constitutes a preferred embodiment of this invention, it is to be understood that the invention is not limited to this precise form of apparatus, and that changes may be made therein without departing from the scope of the invention which is defined in the appended claims.

I claim:

1. A reverse hydrocyclone cleaner for centrifugally separating light contaminant particles entrained in a suspension of papermaker's fibers comprising:

a hollow conical body of circular cross-section converging uniformly from a base end toward a second end a tangential inlet positioned adjacent said base end;

a vortex finder extending inwardly through said base end into the hollow conical body, and terminating at an overflowing outlet for said light contaminant particles positioned inwardly of said inlet; and an underflow outlet positioned at said second end for papermaker's fibers;

said hollow conical body defining an inner diameter near said base end and a length between said first and second ends, a ratio of said length to said inner diameter being at least approximately 20:1 thereby defining an included angle of less than 3°.

2. A reverse hydrocyclone cleaner as recited in claim 1 wherein said hollow conical body includes a cap closing said base end and forming said vortex finder.

3. A reverse hydrocyclone cleaner as recited in claim 1 wherein said vortex finder has an outer surface which is frusto-conical and diverges as it extends from said base end into said hollow conical body.

4. A reverse hydrocyclone cleaner as recited in claim 1 wherein said overflow outlet diverges as it extends through said base end into said hollow body.

5. A reverse hydrocyclone cleaner as recited in claim 1 wherein the area of said tangential inlet is approximately equal to the area of said overflow outlet.

6. A hydrocyclone cleaner as recited in claim 1 wherein the area of said underflow outlet is no less than either the area of said tangential inlet or the area of said overflow outlet.

7. A hydrocyclone cleaner as recited in claim 1 wherein said ratio is at least 23:1 defining an included angle of 2.5° or less.

8. A reverse-flow hydrocyclone cleaner for cleaning lightweight contaminant particles from a suspension of papermaker's stock comprising:

a hollow elongated body having a conical configuration over a substantial part of its length and defining a base, an apex and an axis extending between the base and the apex, said hollow body converging uniformly from said base toward said apex;

a cap closing said base;

a vortex finder mounted in said cap, the vortex finder defining an overflow outlet for said lightweight contaminant particles aligned with said axis and converging in a direction opposite said apex;

a tangential inlet through the hollow conical body adjacent said base; and an underflow outlet at said apex for papermaker's fibers;

said hollow conical body defining an inner diameter adjacent to said base and a length along said axis between said base and said apex, a ratio of said length to said inner diameter being at least approximately 20:1.

9. A reverse-flow cyclonic cleaner for removing lightweight contaminant particles from a suspension of papermaker's stock comprising:

a hollow body at least a substantial portion of which is conical defining a base, an apex and an axis extending between said base and said apex, the body portion converging uniformly from said base toward said apex;

a cap closing said base of said hollow body;

a vortex finder mounted by said cap and extending into said body, the outer surface of said vortex finder diverging as it extends into said body;

a reverse-cleaner overflow outlet defined in the vortex finder in alignment with the axis for receiving said lightweight contaminant particles, the reverse-cleaner overflow outlet converging in a direction opposite from said apex;

a tangential inlet through the body near said base for receiving said suspension of papermaker's stock;

an underflow outlet at said apex for receiving papermaker's fibers;

an area of the reverse-cleaner overflow outlet being approximately equal to an area of said inlet, and an area said outlet being no less than the area of either said overflow outlet or said inlet; and said body defining an inner diameter near the base and a length along the axis between the base and the apex, a ratio of the length to said inner diameter being at least approximately 20:1.

* * * * *